United States Patent [19]

Olsson

[11] 4,165,880
[45] Aug. 28, 1979

[54] SEALING DEVICE

[76] Inventor: Hans O. Olsson, Krondikesvägen 42 B, 831 00 Östersund, Sweden

[21] Appl. No.: 922,211

[22] Filed: Jul. 5, 1978

[30] Foreign Application Priority Data

Jul. 11, 1977 [SE] Sweden .............................. 7708034
May 30, 1978 [SE] Sweden .............................. 7806186

[51] Int. Cl.² .............................................. F16J 15/46
[52] U.S. Cl. ........................................ 277/3; 277/27;
277/34.3; 277/188 A; 92/240
[58] Field of Search ................... 277/3, 27, 34.3, 34.6,
277/188 R, 188 A, 16; 92/182, 240

[56] References Cited

U.S. PATENT DOCUMENTS

| 3,166,991 | 1/1965 | Blenke | 92/240 X |
| 3,182,568 | 5/1965 | Davis | 92/240 X |
| 3,514,113 | 5/1970 | Weiswurm | 277/3 |
| 3,565,446 | 2/1971 | Nyberg | 92/182 X |
| 3,887,199 | 6/1975 | Sundqvist | 277/3 X |
| 3,994,208 | 11/1976 | Boyer | 92/240 X |

FOREIGN PATENT DOCUMENTS 13012 of 1915 United Kingdom ................... 277/34.3

Primary Examiner—Robert S. Ward, Jr.
Attorney, Agent, or Firm—Laurence R. Brown

[57] ABSTRACT

A sealing device in a cylindrical or annular working chamber in hydraulic mechanisms consists of a disk or plug formed as a sealing ring holder and from such a deformable material that by the action of increasing hydraulic fluid pressure the material radially expands into completely sealingly contact with the chamber. The disk or plug is provided with a sealing ring for performing the sealing function before said pressure increase.

4 Claims, 4 Drawing Figures

SEALING DEVICE

This invention is concerned with a specific sealing problem which is above all encountered between coaxial cylindrical surfaces with intervening clearances in hydraulic coupling, braking or power transmission mechanisms in order that these mechanisms shall function also at very high hydraulic pressures without any leakage through the clearances and resulting pressure drop.

In other words, the invention relates to a device for preventing leakage through annular clearances or gaps starting from or opening into cylindrical or annular pressure and working chambers in hydraulic coupling and power transmission mechanisms operating with hydraulic fluid as pressure transmitting medium.

Hydraulic couplings, substantially utilized for connecting a hub or like means to a shaft, have been known since long, as is evidenced for example by French Pat. No. FR 1 092 416 and Switzerland Pat. No. CH 408 552. Characteristic of these couplings is a working chamber filled with hydraulic fluid and having a relatively thin, elastically deformable wall inside one of the cylindrical surfaces to be pressed against one another, said working chamber being in communication with a device for increasing the specific pressure of the hydraulic fluid. This pressure producing device usually is a pressure cylinder with a reciprocable plunger arranged with clearance therein.

The efficiency and the reliability of such a coupling is dependent upon the possibility of providing a sufficiently high pressure for elastic deformation of said deformable wall to the requisite coupling pressure, particularly when said wall must be of great thickness at high power transmission, and upon the possibility of maintaining or retaining this pressure for long periods.

Obviously, these problems are bound with the risk of leakage through the clearance between the pressure cylinder and the plunger in the device for increasing the specific pressure of the hydraulic fluid. Quite as obvious is that a solution of the problem of preventing such leakage will be generally applicable to all cylindrically annular clearances between coaxial cylindrical circumferential surfaces.

German Pat. No. DE 2 403 337 suggests a solution of the problem of preventing leakage and the resulting gradual decrease of hydraulic pressures in such couplings. This solution does not imply any sealing of the leaking clearance but instead consists in the provision of a shut-off valve in the connection between the pressure cylinder (the primary pressure chamber) and the working chamber. This implies two operable devices, viz. one for pressure supply and the other for shutting off the connection between the source of pressure and the coupling point.

According to the solution of this sealing problem, which is suggested by the present invention, there is inserted in each chamber in front of the mouth of the clearance or gap a disk or plug which fills out the cross-section of the chamber, leaving substantially the same clearance, said disk or plug being formed as a sealing ring holder and being made from such a deformable material that by the action of an increasing pressure on the hydraulic fluid said material radially expands until the sealing ring holder completely, that is without any clearance, sealingly closes the entire cross-section of the chamber, and in a groove in the coaxial surface of each sealing ring holder, which surface faces the cylindrical surface of a chamber wall, there is disposed a sealing ring for performing the sealing function before the sealing ring holder by the pressure increase of the hydraulic fluid has radially expanded so as to completely close the cross-section of the chamber.

The invention is thus based upon the idea of making use of two overlapping sealing functions, one of said functions being realized by a sealing ring, for example an O-ring seal, which is operative at low and moderately elevated pressures, while the other function is realized by a body which radially expands at increasing pressures and completely shuts off the gap or clearance before the pressure has risen to such a height that the sealing capacity of the sealing ring ceases or the sealing ring at repeated pressure changes is chewed to pieces.

As the gaps or clearances through which leakage might take place, start from or open into a pressure or working chamber for the hydraulic fluid, the sealing device consists of a disk or plug arranged in front of the mouth of the gap or clearance and confronting the respective chamber, said disk or plug being formed as a sealing ring holder filling out the cross-section of the respective chamber while leaving substantially the same clearance, and made from such a deformable material that by the action of increasing hydraulic pressures said material radially expands so as to fill out and thereby seal the clearance or gap thus also in existence between the sealing ring holder and the walls of the respective chamber, there being simultaneously provided in the cylindrical surface of the sealing ring holder, facing the wall of the respective chamber, a groove with a sealing ring arranged in said groove to perform the sealing function before said clearances or gaps at increasing hydraulic pressure have been clogged by the radial expansion of the sealing ring holder. At the part of the sealing ring holder located between the groove for the sealing ring and the hydraulic fluid said gaps or clearances are considerably larger than on the other side of the groove for the sealing ring.

For most practical uses the deformable material from which the sealing ring holder is made, preferably is a rigid plastic of the super polyamide type which is marketed under the designation "Erlaton", or another polymer having the corresponding properties.

To facilitate the understanding of the design, usefulness and function of the improved sealing device, reference is made to the accompanying drawings in which.

In the drawing figures the same reference numerals designate the same or corresponding details.

Figure 1:
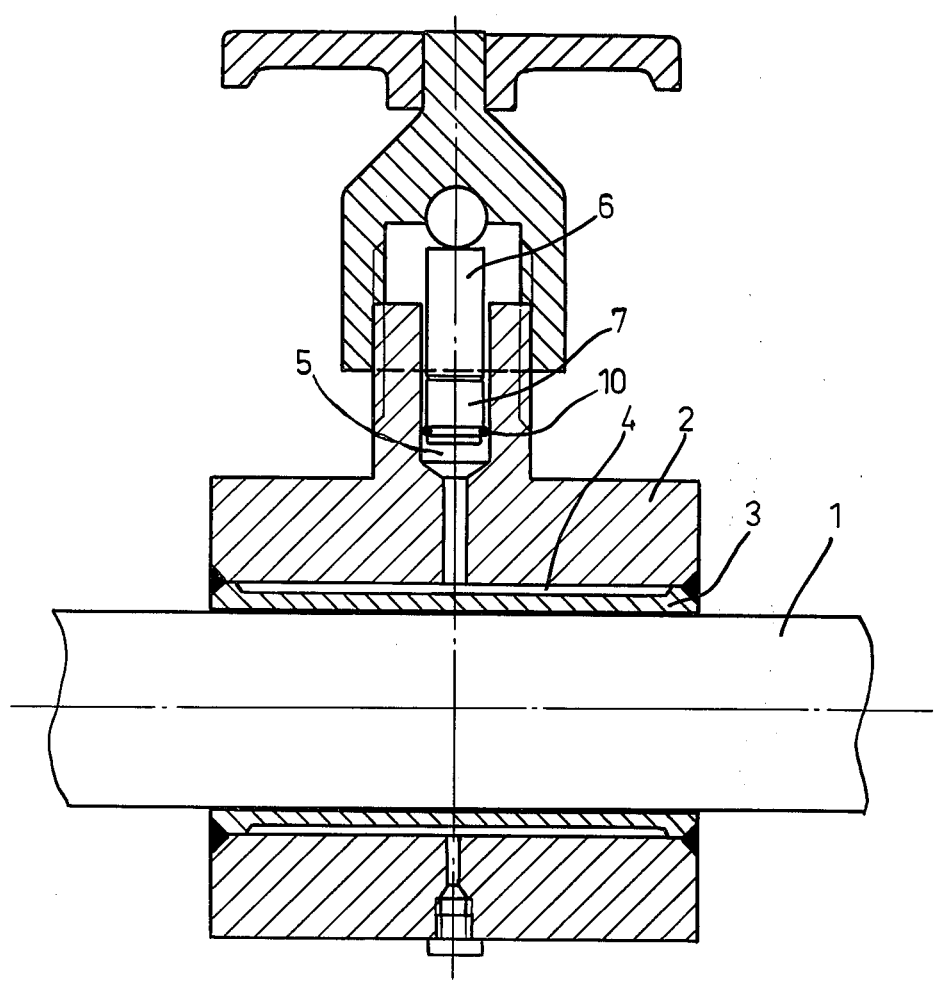
FIG. 1 is a sectional view of a hydraulic fluid (i.e. hydraulic) coupling between a shaft and a pedestal or a hub, with the seal arranged in a clearance between the plunger and the cylinder of the device where the coupling pressure is realized.

For the sake of simplicity the sealing rings in the figures shown are O-rings.

1 designates a shaft or journal with which there shall be coupled a wheel hub 2, a pedestal or like element by the intermediary of a cylindrical metal wall 3 expanding under hydraulic pressure. Said metal wall 3 is one wall of a working chamber 4 which is in open communication with a pressure cylinder 5 in which a plunger 6 is arranged with clearance for applying the desired pressure to a hydraulic fluid which completely fills out a space in the pressure cylinder 5 in front of the plunger 6, the working chamber 4 and the connection between them.

When the specific pressure of the hydraulic fluid is increased by the plunger 6 being pushed into the cylinder 5, this results in an expansion of the wall 3 so that it is urged under pressure against the shaft 1, whereby coupling is realized.

To provide a stable construction and to permit transmission of large torques the embodiment shown in FIG. 1 of course requires a thick wall 3, which in turn requires a high specific pressure on the hydraulic fluid to expand the wall 3 into application with the shaft 1 under satisfactory coupling pressure. For such high hydraulic pressures an ordinary arrangement with a sealing ring, such as an O-ring seal, an X-ring seal or a seal with a U-shaped packing, disposed in a groove will be insufficient to prevent leakage through the clearance between the plunger 6 and the pressure cylinder 5.

For the prevention of such a leakage a sealing ring holder 7 formed with a groove for a sealing ring 10 is arranged in accordance with the present invention in front of the plunger 6, said sealing ring holder having substantially the same clearance on the plunger side of the sealing ring groove as the clearance existing between the plunger and its cylinder, while the clearance on the other side of the sealing ring groove, i.e. towards the hydraulic fluid is considerably larger. This sealing ring holder is made from a material which is so deformable that at increasing hydraulic pressure it expands into sealing engagement with the wall of the cylinder 5 before the pressure has risen so much that the sealing ring has lost its sealing effect. In other words, the function can be expressed in such a way that before the pressure has risen to such a value that the sealing ring penetrates into the clearance between the sealing ring holder and the cylinder wall, said sealing ring holder has expanded so that no clearance exists any more because it has been filled out by the expanding holder material.

Figure 2:
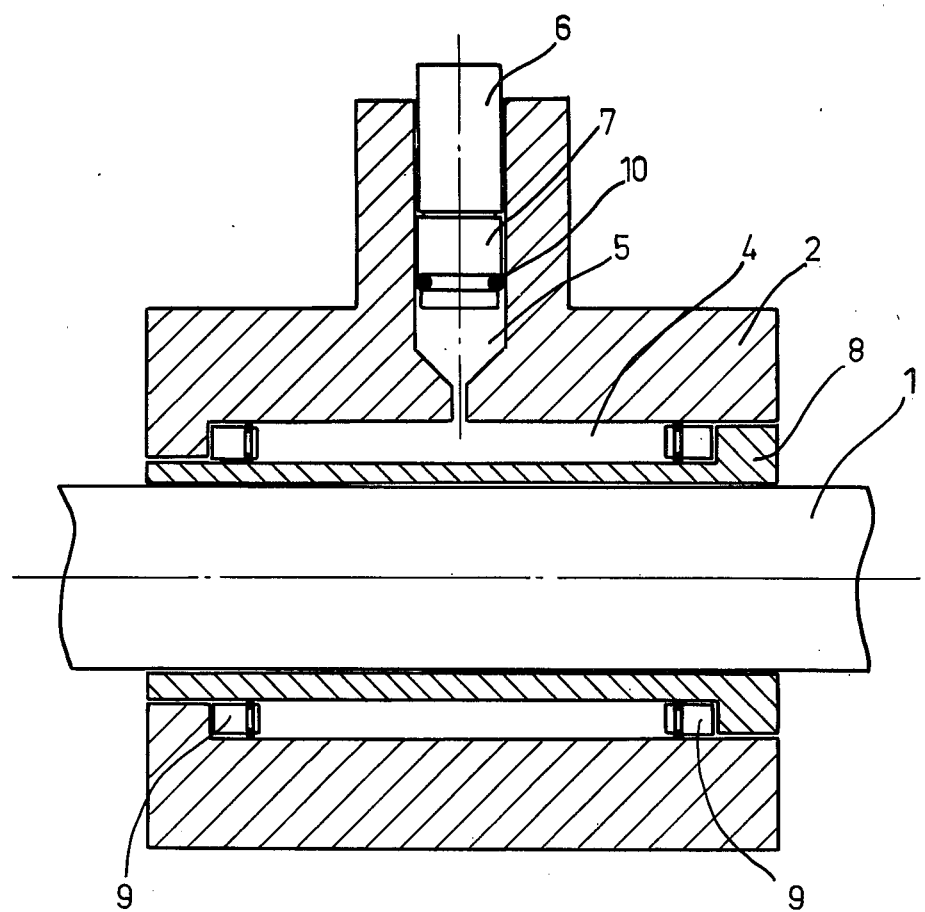
FIG. 2 is a sectional view of an arrangement having sealing devices according to the invention both between a pressure producing plunger and its cylinder wall and between a bushing, which engages a shaft, and a pedestal or a hub.

FIG. 2 shows a case in which the sealing device for cylindrically annular gaps according to the invention is also utilized to seal other clearances than those between pressure cylinder and plunger, viz. gaps between a bushing 8, which defines a working chamber, and a hub 2, a pedestal or like element. In this case the sealing ring holder is formed as a cylindrical annulus 9 having grooves for sealing rings both in the outer and the inner circumferential surface. All sealing rings are designated 10. Such an annular sealing ring holder can of course also be utilized to seal in front of a correspondingly shaped plunger operating in an annular pressure chamber.

Figure 3:
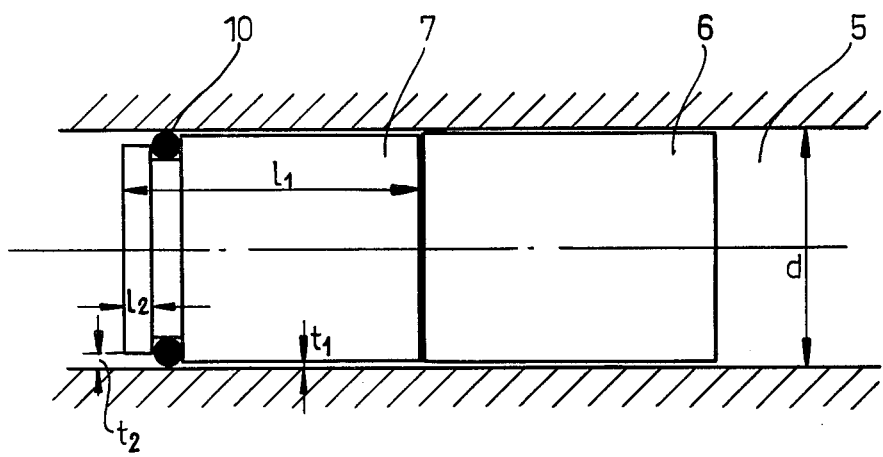
FIGS. 3 and 4 are views of two different embodiments of a sealing ring holder according to the invention inserted in a pressure cylinder for sealing a plunger therein.

In FIG. 3 the hatched area indicates the wall of a pressure cylinder 5 in which there are inserted a plunger 6, a sealing ring holder 7 having a groove for a sealing ring, and a sealing ring disposed in the groove therefor.

The clearance $t_1$ between the sealing ring holder and the wall of the pressure cylinder is such that without a great force being exerted, the holder can be pushed into the pressure cylinder. For the part $l_2$ of the sealing ring holder which is located between the hydraulic fluid and the sealing ring and is of short axial extension because it only has the task of retaining the sealing ring in the groove, the clearance $t_2$ between the holder and the wall of the pressure cylinder shall be much larger than the clearance $t_1$ so that this part of the holder is not urged into engagement with the inner wall of the cylinder by the action of the hydraulic pressure. In most cases, it has proved suitable for the total length $l_1$ of the sealing ring holder to be approximately equal to the inner diameter d of the pressure cylinder.

At low pressures the sealing ring 10 establishes the seal in the manner known in connection with sealing rings. With increasing pressure the deformable sealing ring holder begins successively to expand in a radial sense, the result being that the small clearance $t_1$ between the holder and the wall of the pressure cylinder disappears and sealing is obtained. Thus, with increasing pressure the sealing ring holder successively assumes the sealing function of the sealing ring, and it is realized that, as was pointed out earlier, there is a pressure range where the two sealing functions overlap.

Figure 4:
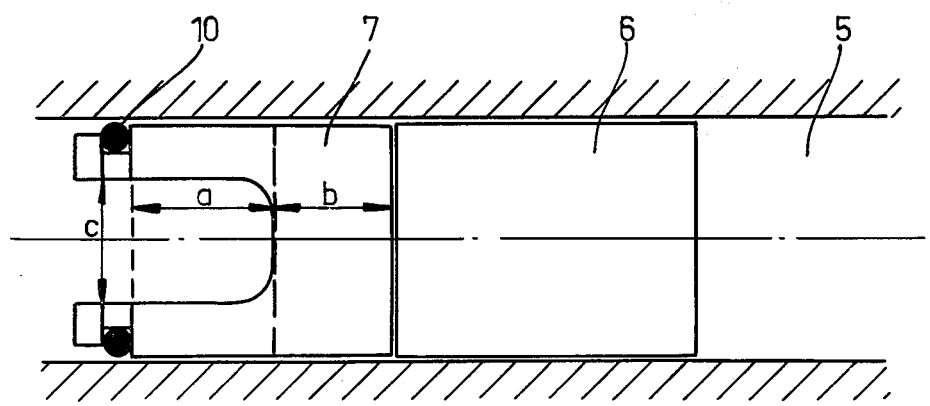

FIG. 4 shows a modified form of the sealing device illustrated in FIG. 3. The sealing ring 10 and the part of the sealing ring holder within the area designated b in FIG. 4 will function in the same way as was described for the device illustrated in FIG. 3. As the sealing ring holder has been provided with a recess or cavity facing the hydraulic fluid and characterized in FIG. 4 by areas a and c, a further sealing function is realized in addition to those described with reference to FIG. 3. More particularly, this is the sealing function obtained in that the sealing ring holder within area a will be urged against the wall of the pressure cylinder by the action of the pressure from the hydraulic fluid contained in the cavity of the sealing ring holder.

With the above described embodiment of the sealing ring holder there is obtained, in a normal case, the following sealing course when the pressure in the hydraulic system increases. At low pressures the sealing ring establishes a sealing effect in a known manner. At increasing pressure a sealing effect is successively established within area a by the holder being urged within this area against the cylinder wall by the action of the hydraulic pressure in the cavity, after which at further increasing pressure a sealing effect is obtained by the radial expansion of the holder within area b as a result of the substantially axial compression of the holder within this area due to the hydraulic pressure. It is realized that if the distance b is successively reduced, the sealing function established by the sealing ring holder being urged against the cylinder wall by the action of the hydraulic pressure in the cavity will be ever more predominating.

An advantage of this arrangement is that a greater flexibility is gained as regards dimensions and materials in the construction of hydraulic seals which shall effectively seal both at low and at very high pressures.

I claim:

1. In a hydraulic system having variable pressure control means for forcing hydraulic fluid out of an exit fluid opening at high pressure the combination for preventing leakage of the high pressure fluid through control means comprising a cylindrical chamber between said pressure control means and said exit fluid opening, a cylindrical plug closely fitted into said chamber retaining hydraulic fluid adjacent said exit opening and receiving force from said control means and said plug being of a deformable material to receive force from said variable pressure control means and thereby to expand with pressure to bear against the chamber wall and seal the entire cross section of the chamber as hydraulic pressure against said fluid increases, a secondary sealing ring for resiliently engaging the cylindrical chamber walls of a material preventing leakage at low hydraulic pressures, and a groove in the plug disposing the sealing ring in sealing contact with the cylinder walls, whereby as the hydraulic pressure increases by means of said variable control means to deform said cylindrical plug the sealing function of preventing hydraulic fluid from leakage out of said chamber is achieved by both said secondary sealing ring and the cylindrical plug.

2. A leakage control system as defined in claim 1 wherein the plug has a longitudinal dimension, said groove is offset nearer one end of said longitudinal dimension, and is disposed to retain said secondary sealing ring in contact with said hydraulic fluid.

3. A system as defined in claim 2 wherein the plug has an axially disposed recess extending thereinto a distance beyond said secondary sealing ring to receive said hydraulic fluid and thereby urge by hydraulic force the secondary sealing ring and accompanying plug surface into the chamber walls.

4. A system as defined in claim 1 wherein the variable pressure control means is coupled to said plug for transfer of force by means of a cylindrical plunger in said chamber.

* * * * *